United States Patent
Armstrong et al.

(10) Patent No.: US 7,613,897 B2
(45) Date of Patent: Nov. 3, 2009

(54) ALLOCATING ENTITLED PROCESSOR CYCLES FOR PREEMPTED VIRTUAL PROCESSORS

(75) Inventors: William Joseph Armstrong, Rochester, MN (US); Naresh Nayar, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 917 days.

(21) Appl. No.: 11/094,712

(22) Filed: Mar. 30, 2005

(65) Prior Publication Data

US 2006/0230400 A1    Oct. 12, 2006

(51) Int. Cl.
G06F 12/00 (2006.01)
G06F 13/00 (2006.01)
G06F 13/28 (2006.01)
G06F 9/46 (2006.01)

(52) U.S. Cl. ...................................... 711/173; 718/102
(58) Field of Classification Search ................. 718/102; 711/173
See application file for complete search history.

(56) References Cited

U.S. PATENT DOCUMENTS

| | | | |
|---|---|---|---|
| 5,210,872 A * | 5/1993 | Ferguson et al. | 718/102 |
| 5,386,561 A * | 1/1995 | Huynh et al. | 718/103 |
| 6,349,321 B1 * | 2/2002 | Katayama | 718/103 |
| 6,668,269 B1 * | 12/2003 | Kamada et al. | 718/103 |
| 2003/0208521 A1 * | 11/2003 | Brenner et al. | 709/103 |
| 2008/0052720 A1 * | 2/2008 | Barsness et al. | 718/104 |

OTHER PUBLICATIONS

"CPU Resource Distribution by Power Hypervisor and Partition Load Manager," IBM Redbooks, Publish Date Oct. 16, 2004, http://64.233.167.104/search?q=cache:j61ywGXvOEgJ:www.redbooks.ibm.com/abstracts/....

* cited by examiner

Primary Examiner—Sheng-Jen Tsai
(74) Attorney, Agent, or Firm—Owen J. Gamon

(57) ABSTRACT

A method, apparatus, system, and signal-bearing medium that, in an embodiment, calculate a preemption credit for a partition if a virtual processor is preempted and the partition is unable to receive an entitled capacity of physical processor cycles during a dispatch window. The preemption credit is the portion of the entitled capacity that the partition is unable to receive. As long as the partition has a remaining preemption credit, in subsequent dispatch windows, a portion of the preemption credit is allocated to the virtual processor, and the preemption credit is reduced. In this way, in an embodiment, shared processor partitions may be ensured of receiving their entitled allocation of processor cycles.

20 Claims, 7 Drawing Sheets

250
DISPATCHES OF VIRTUAL PROCESSORS TO PHYSICAL PROCESSORS

| | Dispatch Window 0 (10 MSEC) | Dispatch Window 1 (10 MSEC) | Dispatch Window 2 (10 MSEC) | Dispatch Window 3 (10 MSEC) |
|---|---|---|---|---|
| P0 | V0 V0 V0 V0 V4 | V4 V4 V4 V4 V4* | V4 V4 V4 V4 V4* | V4 V4 V4 V4 V4* |
| P1 | V1 V1 V1 V1 | V0 V0 V0 V0 V3 | V3 V3 V3 V3 V3* | V3 V3 V3 V3 V3* |
| P2 | V2 V2 V2 V2 | V1 V1 V1 V1 | V0 V0 V0 V0 V2 | V2 V2 V2 V2 V2* |
| P3 | V3 V3 V3 V3 | V2 V2 V2 V2 | V1 V1 V1 V1 | V0 V0 V0 V0 V1 |

| | Dispatch Window 4 (10 MSEC) | Dispatch Window 5 (10 MSEC) | Dispatch Window 6 (10 MSEC) | Dispatch Window 7 (10 MSEC) |
|---|---|---|---|---|
| P0 | V4 V4 V4 V4 V0 | V0 V0 V0 V0 V0* | V0 V0 V0 V0 V0* | V0 V0 V0 V0 V0* |
| P1 | V3 V3 V3 V3 V3* | V3 V3 V3 V3 V4 | V4 V4 V4 V4 V4* | V4 V4 V4 V4 V4* |
| P2 | V2 V2 V2 V2 V2* | V2 V2 V2 V2 V2* | V2 V2 V2 V2 V3 | V3 V3 V3 V3 V3* |
| P3 | V1 V1 V1 V1 V1* | V1 V1 V1 V1 V1* | V1 V1 V1 V1 V1* | V1 V1 V1 V1 V2 |

FIG. 2B

ALLOCATING ENTITLED PROCESSOR CYCLES FOR PREEMPTED VIRTUAL PROCESSORS

FIELD

An embodiment of the invention generally relates to computers. In particular, an embodiment of the invention generally relates to allocating virtual processors in shared processor partitions in a computer system.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago. One significant advance in computer technology is the development of parallel processing, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads, so that multiple tasks can essentially be performed at the same time.

In addition, some computers implement the concept of logical partitioning, where a single physical computer is permitted to operate essentially like multiple and independent virtual computers, referred to as logical partitions, with the various resources in the physical computer (e.g., processors, memory, and input/output devices) allocated among the various logical partitions. Each logical partition executes a separate operating system, and from the perspective of users and of the software applications executing on the logical partition, operates as a fully independent computer. Each of the multiple operating system runs in a separate partition, which operate under the control of a partition manager or hypervisor.

Not only many individual resources, such as processors, be allocated to the partitions, but portions of resources may also be allocated. Thus, the concept of a shared processor partition has been developed. A shared processor partition is one that shares the physical processors in a shared pool of processors with other shared processor partitions. One of the configuration parameters for shared processor partitions is the entitled capacity of the partition. The entitled capacity of a partition defines the partition share of the physical processors over a period of time. The hypervisor needs to ensure that the entitled capacity of the shared processor partitions does not exceed the capacity of the shared processor pool, which is the set of processors that is being used to run the shared processor partitions. The hypervisor must also ensure that each partition receives physical processor cycles corresponding to its entitled capacity over a period of time, so that each partition receives its fair share of resources and none is starved for performance. This period of time is called the hypervisor dispatch window. Each of the partitions is said to be allocated a "virtual processor," which represents some number of CPU (Central Processing Unit) cycles of one of the physical processors (which may change over time) in the shared processor pool.

From a performance perspective, it is desirable that the virtual processor of a partition receives its allocated cycles in as few dispatches as possible, as long as the virtual processor has work to do. The best possible scenario is for the virtual processor to receive all of its cycles in the dispatch window in a single dispatch. Fewer dispatches has the performance benefit of less switching overhead, which includes saving and restoring the state of the virtual processor. Fewer dispatches also allows efficient uses of processor caches.

In certain configurations, the performance goal of fewer dispatches conflicts with the functional goal of guaranteeing the virtual processor's entitled cycles, so if the hypervisor attempts to give all of the entitled capacity in the dispatch window in one dispatch of the partition, some virtual processors do not received all their entitled capacity.

To illustrate this point, consider the configuration illustrated in FIG. 2A with four physical processors (P0, P1, P2, and P3) and five virtual processors (V0, V1, V2, V3, and V4), with one virtual processor allocated to each of five partitions. In this example, each of the dispatch windows (Dispatch Window0, Dispatch Window1, Dispatch Window2, Dispatch Window3, Dispatch Window4, Dispatch Window5, Dispatch Window6, and Dispatch Window7) represents 10 msec (milliseconds), so that each slot in the table 200 represents the allocation of the given physical processor's CPU cycles to the specified virtual processor for 2 msec. Further, in this example, each of the five virtual processors (V0, V1, V2, V3, and V4) has an entitled capacity of 0.8 of a physical processor, which means that the entitled capacity over the eight dispatch windows is 8*(10 msec)*0.8=64 msec. The empty slots in the table 200 represent the times when the associated physical processor is idle, as a result of each virtual processor only being able to utilize one physical processor at a time. The pattern of allocation of the virtual processors (V0, V1, V2, V3, and V4) into slots in the table 200 represents the hypervisor attempting to give all of the entitled capacity in the dispatch window in one dispatch of the virtual processor.

The result illustrated in the example of FIG. 2A is that virtual processors V0, V1, and V2 all receive at least their entitled capacity of 64 msec (V0 and V1 received 64 msec of physical CPU cycles while virtual processor V2 received 68 msec of physical CPU cycles). Unfortunately, virtual processor V3 only received 38 msec of physical CPU cycles, and virtual processor V4 only received 40 msec of physical CPU cycles. Thus, virtual processors V3 and V4 did not receive their entitled capacity of 64 msec of physical CPU cycles as the result of the hypervisor attempting to give all of the entitled capacity in every dispatch window in one dispatch of the virtual processor.

One current technique for attempting to address this problem is to use very short dispatch windows (e.g., 1 msec). Such a short dispatch window allows the hypervisor to round-robin the partitions over the available physical processors. While this technique guarantees that the partitions will receive their entitled capacity over the dispatch window, it also causes a large switching overhead and results in the hypervisor experiencing difficulty in maintaining processor affinity, which leads to a drop in performance.

Thus, without a better way to balance the performance goal of fewer dispatches with the functional goal of guaranteeing a virtual processor's entitled number of CPU cycles, logically partitioned systems will continue to struggle with performance issues.

SUMMARY

A method, apparatus, system, and signal-bearing medium are provided that, in an embodiment, calculate a preemption credit for a partition if a virtual processor is preempted and the partition is unable to receive an entitled capacity of physical processor cycles during a dispatch window. The preemption credit is the portion of the entitled capacity that the partition is unable to receive. As long as the partition has a remaining preemption credit, in subsequent dispatch windows, a portion of the preemption credit is allocated to the virtual processor, and the preemption credit is reduced. In this way, in an embodiment, shared processor partitions may be ensured of receiving their entitled allocation of processor cycles.

BRIEF DESCRIPTION OF THE DRAWINGS

Various embodiments of the present invention are hereinafter described in conjunction with the appended drawings:

FIG. 2B depicts a block diagram of dispatches of virtual processors to physical processors, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
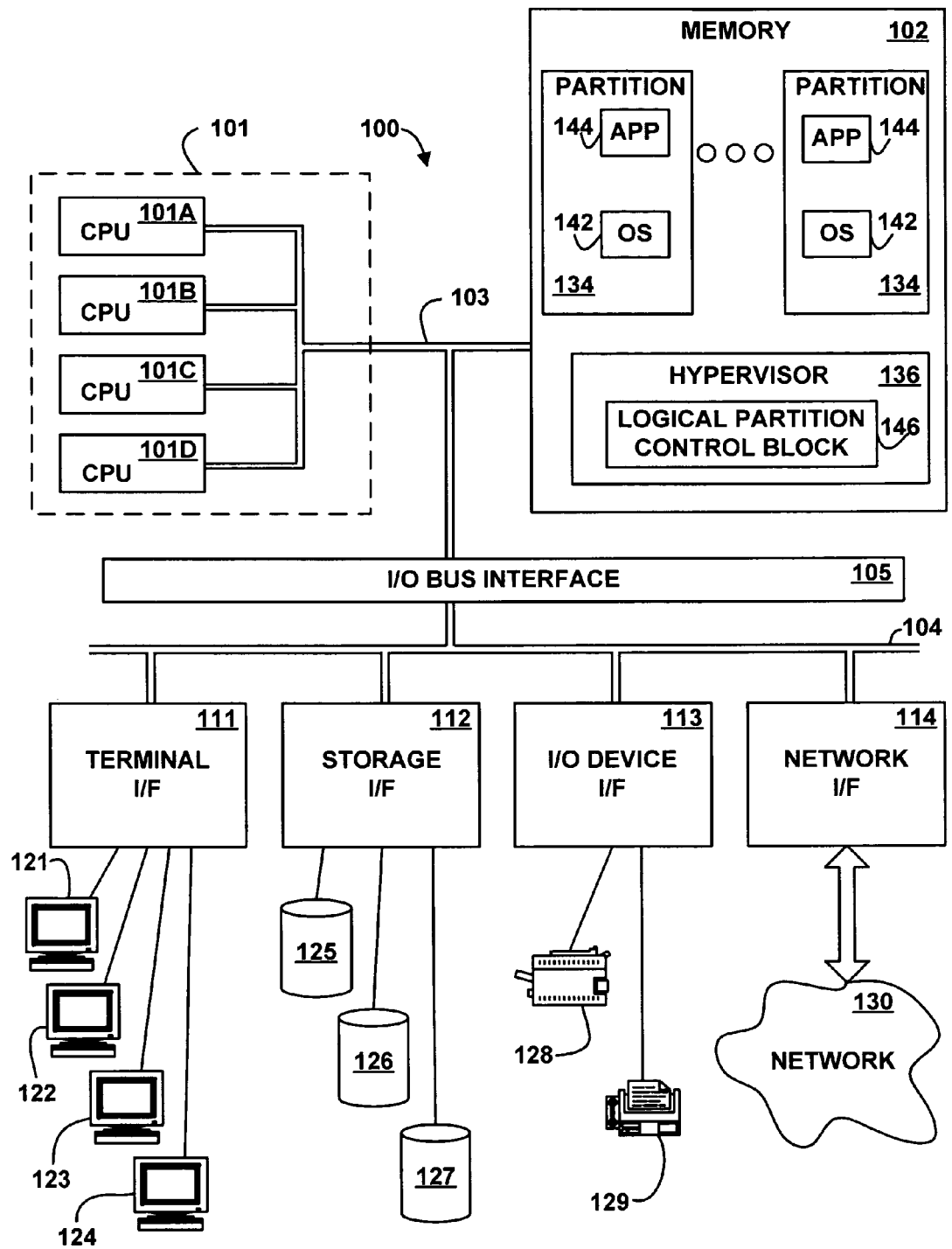
FIG. 1 depicts a block diagram of an example system for implementing an embodiment of the invention.

Referring to the Drawings, wherein like numbers denote like parts throughout the several views, FIG. 1 depicts a high-level block diagram representation of a computer system 100 connected to a network 130, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as a processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 is illustrated as containing the primary software components and resources utilized in implementing a logically partitioned computing environment on the computer 100, including a plurality of logical partitions 134 managed by a partition manager or hypervisor 136. Although the partitions 134 and the hypervisor 136 are illustrated as being contained within the memory 102 in the computer system 100, in other embodiments some or all of them may be on different computer systems and may be accessed remotely, e.g., via the network 130. Further, the computer system 100 may use virtual addressing mechanisms that allow the programs of the computer system 100 to behave as if they only have access to a large, single storage entity instead of access to multiple, smaller storage entities. Thus, while the partitions 134 and the hypervisor 136 are illustrated as residing in the memory 102, these elements are not necessarily all completely contained in the same storage device at the same time.

Each of the logical partitions 134 utilizes an operating system 142, which controls the primary operations of the logical partition 134 in the same manner as the operating system of a non-partitioned computer. For example, each operating system 142 may be implemented using the i5OS operating system available from International Business Machines Corporation, but in other embodiments the operating system 142 may be Linux, AIX, UNIX, Microsoft Windows, or any appropriate operating system. Also, some or all of the operating systems 142 may be the same or different from each other. Any number of logical partitions 134 may be supported as is well known in the art, and the number of the logical partitions 134 resident at any time in the computer 100 may change dynamically as partitions are added or removed from the computer 100.

Each of the logical partition 134 executes in a separate, or independent, memory space, and thus each logical partition acts much the same as an independent, non-partitioned computer from the perspective of each application 144 that executes in each such logical partition. As such, user applications typically do not require any special configuration for use in a partitioned environment. Given the nature of logical partitions 134 as separate virtual computers, it may be desirable to support inter-partition communication to permit the logical partitions to communicate with one another as if the logical partitions were on separate physical machines. As such, in some implementations it may be desirable to support an unillustrated virtual local area network (LAN) adapter associated with the hypervisor 136 to permit the logical partitions 134 to communicate with one another via a networking protocol such as the Ethernet protocol. In another embodiment, the virtual network adapter may bridge to a physical adapter, such as the network interface adapter 114. Other manners of supporting communication between partitions may also be supported consistent with embodiments of the invention.

Although the hypervisor 136 is illustrated as being within the memory 102, in other embodiments, all or a portion of the hypervisor 102 may be implemented in firmware or hardware. The hypervisor 136 may perform both low-level partition management functions, such as page table management and may also perform higher-level partition management functions, such as creating and deleting partitions, concurrent I/O maintenance, allocating processors, memory and other hardware or software resources to the various partitions 134.

In an embodiment, the hypervisor 136 includes instructions capable of executing on the processor 101 or statements capable of being interpreted by instructions executing on the processor 101 to perform the functions as further described below with reference to FIGS. 4, 5, and 6. In another embodiment, the hypervisor 136 may be implemented in microcode or firmware. In another embodiment, the hypervisor 136 may be implemented in hardware via logic gates and/or other appropriate hardware techniques.

The hypervisor 136 statically and/or dynamically allocates to each logical partition 134 a portion of the available resources in computer 100. For example, each logical partition 134 may be allocated one or more of the processors 101 and/or one or more hardware threads, as well as a portion of the available memory space. The logical partitions 134 can share specific software and/or hardware resources such as the processors 101, such that a given resource may be utilized by more than one logical partition. In the alternative, software and hardware resources can be allocated to only one logical partition 134 at a time. Additional resources, e.g., mass storage, backup storage, user input, network connections, and the I/O adapters therefor, are typically allocated to one or more of the logical partitions 134. Resources may be allocated in a number of manners, e.g., on a bus-by-bus basis, or on a resource-by-resource basis, with multiple logical partitions sharing resources on the same bus. Some resources may even be allocated to multiple logical partitions at a time. The resources identified herein are examples only, and any appropriate resource capable of being allocated may be used.

The hypervisor 136 includes a logical partition control block 146, which the hypervisor uses to allocate resources among the partitions 134. The logical partition control block 146 is further described below reference to FIG. 3.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number (including zero) of networks (of the same or different types) may be present.

It should be understood that FIG. 1 is intended to depict the representative major components of the computer system 100 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements comprising the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM, DVD-R, or DVD+R;

(2) alterable information stored on a rewriteable storage medium, e.g., a hard disk drive (e.g., the DASD 125, 126, or 127), CD-RW, DVD-RW, DVD+RW, DVD-RAM, or diskette; or (3) information conveyed by a communications medium, such as through a computer or a telephone network, e.g., the network 130, including wireless communications.

Such signal-bearing media, when carrying machine-readable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2A:
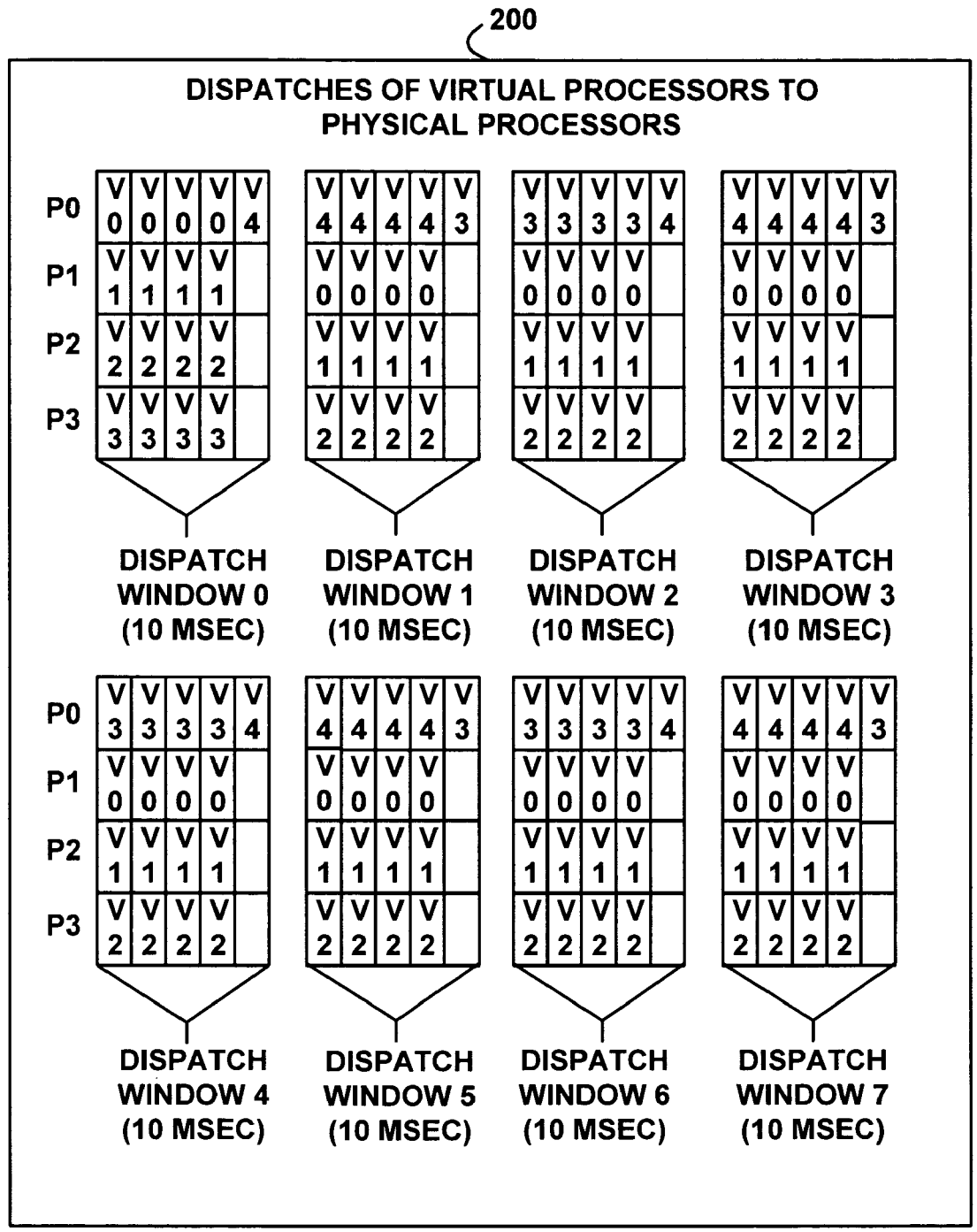
FIG. 2A depicts a block diagram of dispatches of virtual processors to physical processors, according to a technique that attempts to give all of the entitled capacity in a dispatch window in one dispatch of the virtual processor.

FIG. 2A depicts a block diagram of dispatches of virtual processors to physical processors, according to a technique that attempts to give all of the entitled capacity in a dispatch window in one dispatch of the virtual processor. From a performance perspective, it is desirable that the virtual processor of a partition receives its allocated cycles in as few dispatches as possible, as long as the virtual processor has work to do. The best possible scenario is for the virtual processor to receive all of its cycles in the dispatch window in a single dispatch. Fewer dispatches has the performance benefit of less switching overhead, which includes saving and restoring the state of the virtual processor. Fewer dispatches also allows efficient uses of processor caches.

In certain configurations, the performance goal of fewer dispatches conflicts with the functional goal of guaranteeing the virtual processor's entitled cycles, so if the hypervisor attempts to give all of the entitled capacity in the dispatch window in one dispatch of the partition, some virtual processors do not received all their entitled capacity.

To illustrate this point, consider the configuration illustrated in the table 200 with four physical processors (P0, P1, P2, and P3) and five virtual processors (V0, V1, V2, V3, and V4), with one virtual processor allocated to each of five partitions. In the example shown in FIG. 2A, each of the dispatch windows (Dispatch Window0, Dispatch Window1, Dispatch Window2, Dispatch Window3, Dispatch Window4, Dispatch Window5, Dispatch Window6, and Dispatch Window7) represents 10 msec (milliseconds), so that each slot in the table 200 represents the allocation of the given physical processor's CPU cycles to the specified virtual processor for 2 msec. Further, each of the example five virtual processors (V0, V1, V2, V3, and V4) has an entitled capacity of 0.8 of a physical processor, which means that the entitled capacity over the eight dispatch windows is 8*(10 msec)*0.8=64 msec. The empty slots in the table 200 represent the times when the associated physical processor is idle, as a result of each virtual processor only being able to utilize one physical processor at a time. The pattern of allocation of the virtual processors (V0, V1, V2, V3, and V4) into slots in the table 200 represents the hypervisor attempting to give all of the entitled capacity in the dispatch window in one dispatch of the virtual processor.

The result illustrated in the example of FIG. 2A is that virtual processors V0, V1, and V2 all receive at least their entitled capacity of 64 msec. Virtual processor V0 received 8 msec from physical processor P0 and 56 msec from physical processor P1. Virtual processor V1 received 8 msec from physical processor P1, 56 msec from physical processor P1.

Virtual processor P2 received 4 msec from physical processor P1, 8 msec from physical processor P2, and 56 msec from physical processor P3.

Unfortunately, virtual processor V3 only received 38 msec of physical CPU cycles (30 msec from physical processor P0 and 8 msec from physical processor P3), and virtual processor V4 only received 40 msec of physical CPU cycles (40 msec from physical processor P0). Thus, virtual processors V3 and V4 did not receive their entitled capacity of 64 msec of physical CPU cycles as the result of the hypervisor attempting to give all of the entitled capacity in every dispatch window in one dispatch of the virtual processor.

FIG. 2B depicts a block diagram 250 of dispatches of virtual processors to physical processors, according to an embodiment of the invention. The configuration illustrated in FIG. 2B has four physical processors (P0, P1, P2, and P3), which correspond to the processors 101, but in another embodiment any number of physical processors may be present. FIG. 2B also includes five virtual processors (V0, V1, V2, V3, and V4), with one virtual processor allocated to each of five example partitions, such as any of the partitions 134, but in other embodiments any number of partitions may be present, and a partition may have any number of associated virtual processors.

Each of the dispatch windows (Dispatch Window0, Dispatch Window1, Dispatch Window2, Dispatch Window3, Dispatch Window4, Dispatch Window5, Dispatch Window6, and Dispatch Window7) represents 10 msec (milliseconds), so that each slot in the table 250 represents the allocation of the given physical processor's CPU cycles to the specified virtual processor for 2 msec. In other embodiments, any appropriate dispatch window may be used.

In the example, each of the five virtual processors (V0, V1, V2, V3, and V4) has an entitled capacity of 0.8 of a physical processor, which means that the entitled capacity over the eight dispatch windows is 8*(10 msec)*0.8=64 msec. In another embodiment, any entitled capacity may be used, and the entitled capacity may be expressed in CPU time, CPU cycles, a percentage or fraction of a physical processor, or any other appropriate units. The empty slots in the table 250 represent the times when the associated physical processor 101 is idle, as a result of each virtual processor only being able to utilize one physical processor at a time. The example pattern of allocation of the virtual processors (V0, V1, V2, V3, and V4) into slots in the table 250 represents the hypervisor 136 using a preemption technique, as further described below with reference to FIGS. 4, 5, and 6.

Using the technique of an embodiment of the invention, the hypervisor 136 switches in a preempted virtual processor and detects that the partition 134 will not be able to use all the cycles in the current dispatch window, so the hypervisor 136 gives a preemption credit to the partition 134. The prevention credit is the number of processor cycles that the partition 134 is unable to use in the current dispatch window. The partition 134 retains its preemption credit cycles when the dispatch window changes, in contrast to the example of FIG. 2A where the partition's processor cycles are lost when the dispatch window changes. The hypervisor 136 then allows the partition 134 to use the preemption credit processor cycles in a subsequent set of dispatch windows to make up for lost opportunity in the current dispatch window. When a partition 134 is using its preemption credit cycles, another partition 134 or set of partitions 134 may not receive its entitled cycles of the dispatch window. That, in turn, causes those partitions 134 to be credited with preemption credit cycles that they may use over a subsequent series of dispatch windows. Since the entitled capacity of the partitions in the shared pool cannot exceed the capacity of the pool, the cumulative preemption credit does not grow without bound.

In a steady state embodiment, with all partitions 134 running a CPU bound workload, the preemption credit cycles through a set of partitions 134, the shared processor pool's capacity will be completely utilized, and the virtual processors will receive long dispatches, resulting in improved performance. The cost of an embodiment of the invention is that a partition 134 does not necessarily receive its entitled cycles in every dispatch window. A partition 134 may receive less than its entitled cycles in a certain dispatch window, and then may use the accrued preemption credit cycles in a following dispatch window to make up for the missed processor cycles in the previous dispatch window. The hypervisor 136 does not necessarily meet its guarantee of allocating a partition 134 it's entitled capacity during every dispatch window, but as long as the dispatch window is short enough, the partition 134 workloads are not impacted.

The preemption credit technique of an embodiment of the present invention is illustrated in table 250 of FIG. 2B. The slots denoted by an asterisk ("*") in table 250 represent the use of the preemption credit cycles. For example, during Dispatch Window0, virtual processor V4 did not receive its full allocation (8 msec in the example) of entitled physical processor cycles. Instead, virtual processor V4 only received 2 msec of physical processor cycles in Dispatch Window0. Thus, in response to being preempted at the end of Dispatch Window0, the virtual processor V4 receives preemption credit of 6 msec (the portion of the full entitlement that it did not receive in Dispatch Window0), which it uses during Dispatch Window1, Dispatch Window2, and Dispatch Window3 to receive an additional allocation of physical processor cycles, as indicated by the asterisks.

In a similar fashion, virtual processor V3 is preempted at the end of Dispatch Window1, so virtual processor V3 receives preemption credit, which it uses during Dispatch Window2, Dispatch Window3, and Dispatch Window4 to receive an additional allocation of physical processor cycles, as indicated by the asterisks.

In a similar fashion, virtual processor V2 is preempted at the end of Dispatch Window2, so virtual processor V2 receives preemption credit, which it uses during Dispatch Window3, Dispatch Window4, and Dispatch Window5 to receive an additional allocation of physical processor cycles, as indicated by the asterisks.

In a similar fashion, virtual processor V1 is preempted at the end of Dispatch Window3, so virtual processor V1 receives preemption credit, which it uses during Dispatch Window4, Dispatch Window5, Dispatch Window6 to receive an additional allocation of physical processor cycles, as indicated by the asterisks. In a similar fashion, virtual processor V0 is preempted at the end of Dispatch Window4, so virtual processor V0 also receives preemption credit, which it uses during Dispatch Window5, Dispatch Window6, and Dispatch Window7. The preemption credit is further described below with reference to FIG. 3.

Figure 3:
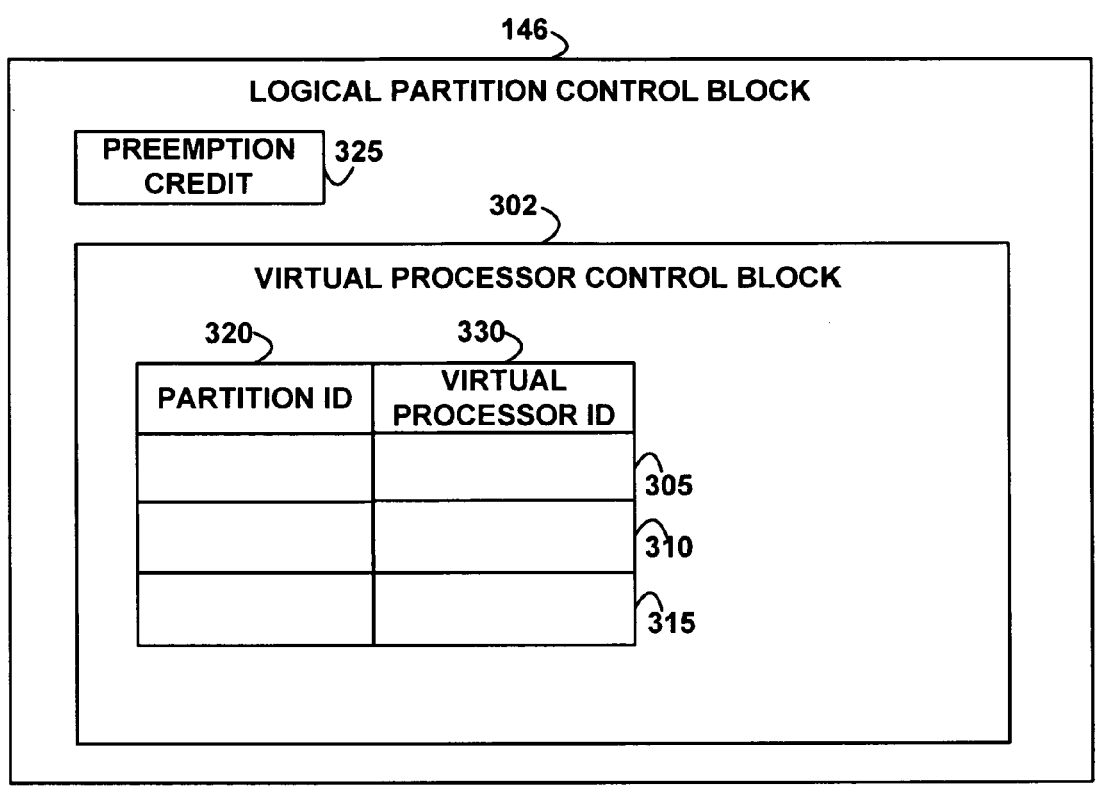
FIG. 3 depicts a block diagram of a logical partition control block, according to an embodiment of the invention.

FIG. 3 depicts a block diagram of a logical partition control block 146, according to an embodiment of the invention. The logical partition control block 146 includes a virtual processor control block 302 and a preemption credit 325. Although only one virtual processor control block 302 is illustrated, in other embodiments any number of virtual processor control blocks may be present, such as one virtual processor control block representing every virtual processor or one virtual processor control block for every partition 134. The virtual processor control block 302 includes records 305, 310, and 315, but in other embodiments any number of records with any appropriate data may be present. Each of the records 305, 310, and 315 includes a partition identifier field of 320 and a virtual processor identifier field 330, but in other embodiments more or fewer fields may be present.

The partition identifier field 320 identifies one of the partitions 134 associated with the record. The virtual processor identifier field 330 identifies the virtual processor associated with the record. Thus, each of the records 305, 310, and 315 represents a virtual processor 330 assigned to the partition 134 identified by the partition identifier 320 to which the hypervisor 136 may allocate a physical processor 101 for a time period within a dispatch window to perform the work associated with the partition 134. Thus, as used herein, a virtual processor is a time period or number of cycles of a physical processor that is allocated to one of the partitions 134, and a virtual processor is represented by a data structure, such as a record in the virtual processor control block 302. The virtual processor control block 302 is used by the hypervisor 136 as further described below with reference to FIGS. 4, 5, and 6. The preemption credit 325 identifies the amount of preemption credit that the partition associated with the logical partition control block 146 has accrued by an associated virtual processor being preempted before it has used its entitled processor cycles in a dispatch window.

Figure 4:
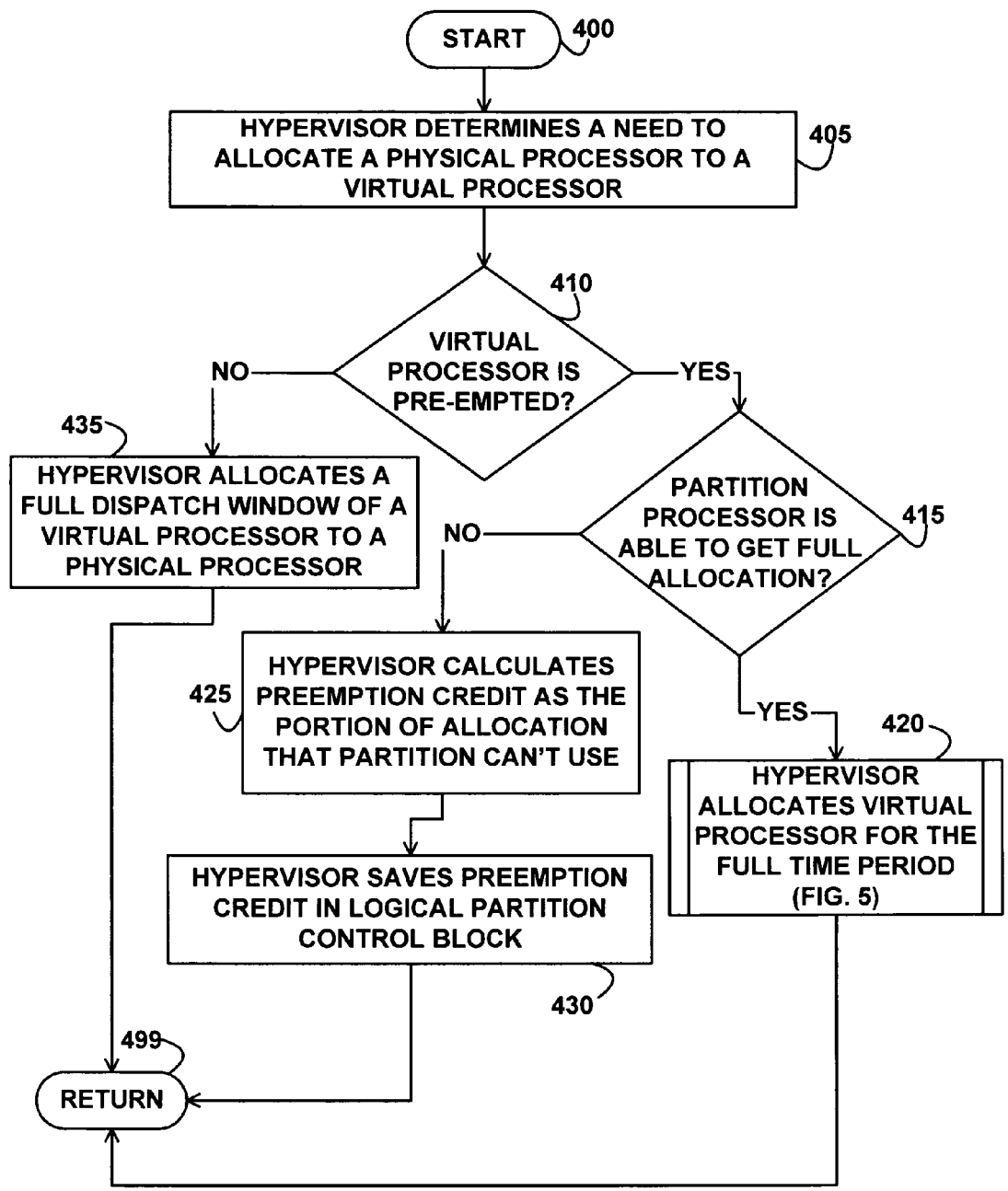
FIG. 4 depicts a flowchart of example processing for allocating a physical processor to a virtual processor, according to an embodiment of the invention.

FIG. 4 depicts a flowchart of example processing for allocating a physical processor to a virtual processor, according to an embodiment of the invention. Control begins at block 400. Control then continues to block 405 where the hypervisor 136 determines a need to allocate a physical processor to a virtual processor. The hypervisor 136 may determine this need based on, for example, the partition 134 requesting the hypervisor for virtual processor cycles in order for the operating system 142 or the application 144 to perform functions.

Control then continues to block 410 where the hypervisor 136 determines whether the execution of the virtual processor has been preempted by another virtual processor. If the determination at block 410 is true, then the virtual processor has been preempted by another virtual processor, so control continues to block 415 where the hypervisor 136 determines whether a partition is able to receive its full allocated capacity of entitled processor cycles within the current dispatch window. If the determination a block 415 is true, then control continues to block 420 where the hypervisor 136 allocates the virtual processor for the full time period, as further described below with reference to FIG. 5. Control then continues to block 499 where the logic of FIG. 4 returns.

If the determination at block 415 is false, then the partition is not able to get its full entitled allocation of processor cycles within the current dispatch window, so control continues to block 425 where the hypervisor 136 calculates the preemption credit 325 for the partition as the portion of the entitled allocation of processor cycles that the partition cannot use within the current dispatch window. In an embodiment, the hypervisor 136 calculates the preemption credit 325 as the full allocation to which the partition is entitled minus (the current time minus the time of the end of the dispatch window).

Control then continues to block 430 where the hypervisor 136 saves the calculated preemption credit 325 in the logical partition control block 146 associated with the partition. Control then continues to block 499 where the logic of FIG. 4 returns.

If the determination at block 410 is false, then the virtual processor has not been preempted, so control continues to block 435 where the hypervisor 136 allocates the full entitlement of processor cycles in the dispatch window to the virtual processor. Control then continues to block 499 where the logic of FIG. 4 returns.

Figure 5:
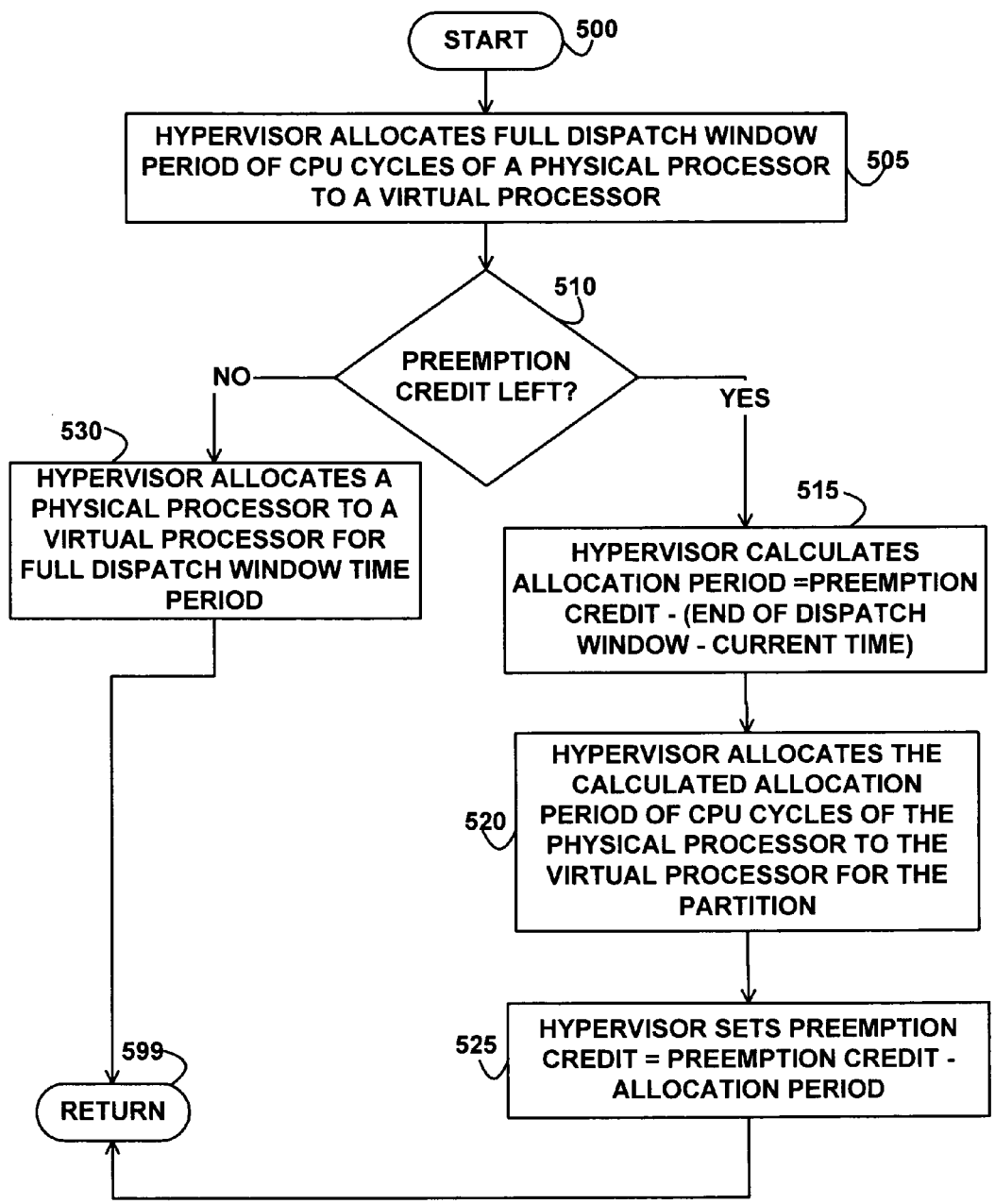
FIG. 5 depicts a flowchart of example processing for allocating a physical processor to a virtual processor for a full time period, according to an embodiment of the invention.

FIG. 5 depicts a flowchart of example processing for allocating a physical processor to a virtual processor, according to an embodiment of the invention. Control begins at block 500. Control then continues to block 505 where the hypervisor 136 allocates a full dispatch window period of CPU cycles of a physical processor 101 to the virtual processor. Control then continues to block 510 where the hypervisor 136 determines whether the partition has any preemption credit 325 remaining. If the determination at block 510 is true, then the partition does have an amount of preemption credit 325 remaining, so control continues to block 515 where the hypervisor calculates an allocation for the partition to be the preemption credit 325 minus (the time of the end of the dispatch window minus the current time), where the allocation is not greater than the preemption credit. Control then continues to block 520 where the hypervisor 136 allocates the calculated allocation period of CPU cycles of the physical processor to the virtual processor. Control then continues to block 525 where the hypervisor 136 sets the preemption credit 325 for the partition to be the current preemption credit 325 minus the calculated allocation period. Control then continues to block 599 where the logic of FIG. 5 returns.

If the determination of block 510 is false, then the partition does not have any preemption credit 325 remaining, so control continues to block 530 where the hypervisor 136 allocates a physical processor to the virtual processor for the full dispatch window time period. Control then continues to block 599 where the logic of FIG. 5 returns.

Figure 6:
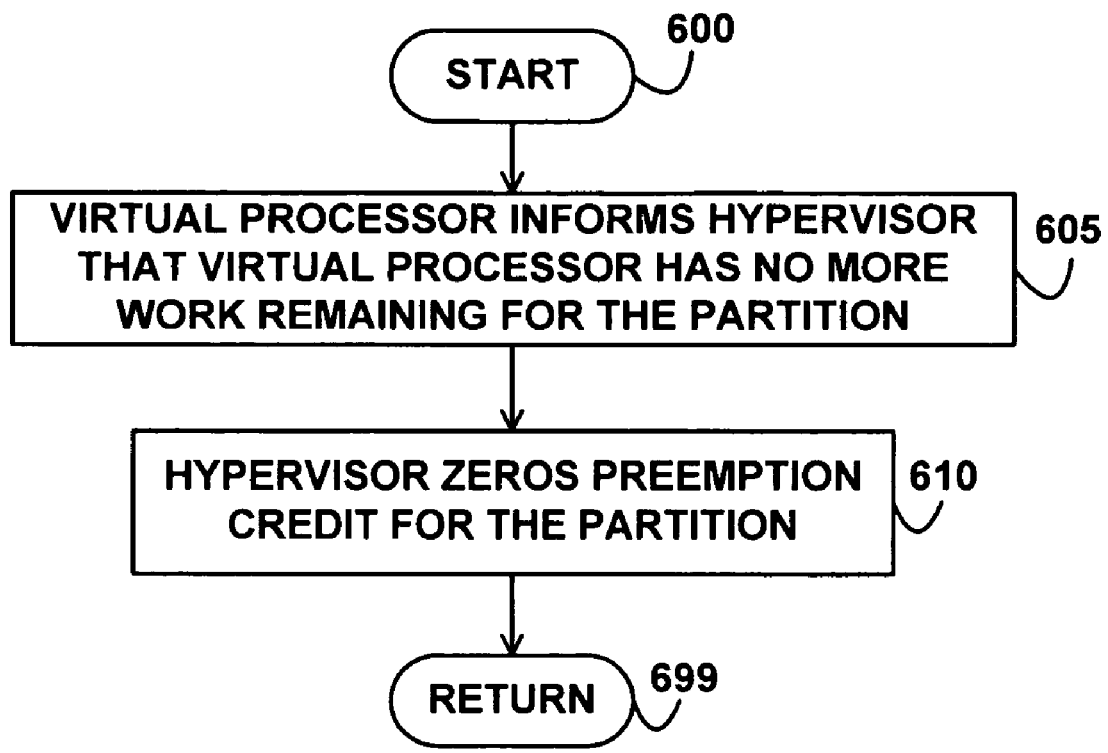
FIG. 6 depicts a flowchart of example processing for zeroing preemption credit for a partition, according to an embodiment of the invention.

FIG. 6 depicts a flowchart of example processing for zeroing the preemption credit 325 for a partition, according to an embodiment of the invention. Control begins at block 600. Control then continues to block 605 where the virtual processor informs the hypervisor 136 that the virtual processor has no more work remaining for the partition. Control then continues to block 610 where the hypervisor zeros the preemption credit 325 associated with the partition. Control then continues to block 699 where the logic of FIG. 6 returns.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method comprising:
    determining whether a virtual processor is preempted and unable to receive an entitled capacity of physical processor cycles of a physical processor during a dispatch

13 window of a partition, wherein the virtual processor is allocated to the partition, and wherein the virtual processor represents a number of cycles of the physical processor, and wherein the physical processor that the virtual processor represents changes between a plurality of physical processors over time;

if the determining is true, allocating a portion of the entitled capacity that the virtual processor was unable to receive to the virtual processor during at least one subsequent dispatch window, wherein the allocating further comprises calculating a preemption credit for the partition based on the entitled capacity of the physical processor cycles that the partition was unable to receive during the dispatch window; and if the determining is false, allocating the entitled capacity to the virtual processor during the subsequent dispatch window.

2. The method of claim 1, wherein the calculating further comprises:
calculating a difference between the preemption credit and a time remaining to an end of the dispatch window.

3. The method of claim 1, wherein the allocating further comprises:
deciding whether the partition has any of the preemption credit remaining; and
if the deciding is true, calculating a portion of the preemption credit, allocating the portion to the virtual processor for the subsequent dispatch window, and reducing the preemption credit by the portion.

4. The method of claim 3, further comprising:
if the deciding is false, allocating the entitled capacity of the physical processor cycles to the virtual processor for the subsequent dispatch window.

5. The method of claim 1, further comprising:
zeroing the preemption credit in response to the virtual processor having no work remaining associated with the partition.

6. A storage medium encoded with instructions, wherein the instructions when executed comprise:
determining whether a virtual processor is preempted and unable to receive an entitled capacity of physical processor cycles of physical processor during a dispatch window of a partition, wherein the virtual processor is allocated to the partition, and wherein the virtual processor represents a number of cycles of the physical processor, and wherein the physical processor that the virtual processor represents changes between a plurality of physical processors over time;

if the determining is true, allocating a portion of the entitled capacity that the virtual processor was unable to receive to the virtual processor during at least one subsequent dispatch window, wherein the allocating further comprises calculating a preemption credit for the partition based on the entitled capacity of the physical processor cycles that the partition was unable to receive during the dispatch window; and if the determining is false, allocating the entitled capacity to the virtual processor during the subsequent dispatch window.

7. The storage medium of claim 6, wherein the calculating further comprises:
calculating a difference between the preemption credit and a time remaining to an end of the dispatch window.

8. The storage medium of claim 6, wherein the allocating further comprises:
deciding whether the partition has any of the preemption credit remaining; and

14 if the deciding is true, calculating a portion of the preemption credit, allocating the portion to the virtual processor for the subsequent dispatch window, and reducing the preemption credit by the portion.

9. The storage medium of claim 8, further comprising:
if the deciding is false, allocating the entitled capacity of the physical processor cycles to the virtual processor for the subsequent dispatch window.

10. The storage medium of claim 6, further comprising:
zeroing the preemption credit in response to the virtual processor having no work remaining associated with the partition.

11. A computer system comprising:
a physical processor; and
a storage device encoded with instructions, wherein the instructions when executed on the physical processor comprise:
determining whether a virtual processor is preempted and unable to receive an entitled capacity of physical processor cycles of the physical processor during a dispatch window of a partition, wherein the virtual processor is allocated to the partition, and wherein the virtual processor represents a number of cycles of the physical processor, and wherein the physical processor that the virtual processor represents changes between a plurality of physical processors over time, if the determining is true, allocating a portion of the entitled capacity that the virtual processor was unable to receive to the virtual processor during at least one subsequent dispatch window, wherein the allocating further comprises calculating a preemption credit for the partition based on the entitled capacity of the physical processor cycles that the partition was unable to receive during the dispatch window, and if the determining is false, allocating the entitled capacity to the virtual processor during the subsequent dispatch window.

12. The computer system of claim 11, wherein the calculating further comprises:
calculating a difference between the preemption credit and a time remaining to an end of the dispatch window.

13. The computer system of claim 11, wherein the allocating further comprises:
deciding whether the partition has any of the preemption credit remaining; and
if the deciding is true, calculating a portion of the preemption credit, allocating the portion of the preemption credit to the virtual processor for the subsequent dispatch window, and reducing the preemption credit by the portion.

14. The computer system of claim 11, wherein the allocating further comprises:
if the deciding is false, allocating the entitled capacity of the physical processor cycles to the virtual processor for the subsequent dispatch window.

15. The computer system of claim 11, wherein the instructions further comprise:
zeroing the preemption credit in response to the virtual processor having no work remaining associated with the partition.

16. A method for configuring a computer, comprising:
configuring the computer to determine whether a virtual processor is preempted and unable to receive an entitled capacity of physical processor cycles of a physical processor during a dispatch window of a partition, wherein the virtual processor is allocated to the partition, and wherein the virtual processor represents a number of cycles of the physical processor, and wherein the physical processor that the virtual processor represents changes between a plurality of physical processors over time;

configuring the computer to allocate a portion of the entitled capacity that the virtual processor was unable to receive to the virtual processor during at least one subsequent dispatch window if the virtual processor is preempted, wherein the configuring the computer to allocate further comprises configuring the computer to calculate a preemption credit for the partition based on the entitled capacity of the physical processor cycles that the partition was unable to receive during the dispatch window; and configuring the computer to allocate the entitled capacity to the virtual processor during the subsequent dispatch window if the virtual processor is not preempted.

17. The method of claim 16, wherein the configuring the computer to allocate further comprises:

configuring the computer to calculate a preemption credit for the partition based on the portion of the entitled capacity of the physical processor cycles that the partition was unable to receive during the dispatch window.

18. The method of claim 16, wherein the configuring the computer to calculate further comprises:

configuring the computer to calculate a difference between the preemption credit and a time remaining to an end of the dispatch window.

19. The method of claim 16, wherein the configuring the computer to allocate further comprises:

configuring the computer to decide whether the partition has any of the preemption credit remaining; and configuring the computer to calculate a portion of the preemption credit, allocate the portion of the preemption credit to the virtual processor for the subsequent dispatch window, and reduce the preemption credit by the portion if the partition has any of the preemption credit remaining.

20. The method of claim 16, further comprising:

configuring the computer to allocate the entitled capacity of the physical processor cycles to the virtual processor for the subsequent dispatch window if the partition does not have any of the preemption credit remaining.

* * * * *

UNITED STATES PATENT AND TRADEMARK OFFICE
CERTIFICATE OF CORRECTION

PATENT NO. : 7,613,897 B2  Page 1 of 1
APPLICATION NO. : 11/094712
DATED : November 3, 2009
INVENTOR(S) : Armstrong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1253 days.

Signed and Sealed this

Nineteenth Day of October, 2010

David J. Kappos
*Director of the United States Patent and Trademark Office*